United States Patent
Takagi et al.

(10) Patent No.: US 10,542,726 B2
(45) Date of Patent: *Jan. 28, 2020

(54) TOILET FOR ANIMAL (71) Applicant: UNICHARM CORPORATION, Ehime (JP)

(72) Inventors: Chiyo Takagi, Kagawa (JP); Shinya Kaneko, Kagawa (JP)

(73) Assignee: Unicharm Corporation, Ehime (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/763,731

(22) PCT Filed: Mar. 9, 2015

(86) PCT No.: PCT/JP2015/056838
§ 371 (c)(1),
(2) Date: Jul. 27, 2015

(87) PCT Pub. No.: WO2016/139816
PCT Pub. Date: Sep. 9, 2016

(65) Prior Publication Data
US 2018/0184614 A1  Jul. 5, 2018

(30) Foreign Application Priority Data
Mar. 2, 2015 (JP) ................................. 2015-040204

(51) Int. Cl.
*A01K 1/01* (2006.01)
*A01K 29/00* (2006.01)

(52) U.S. Cl.
CPC ............ *A01K 1/0114* (2013.01); *A01K 1/011* (2013.01); *A01K 1/0107* (2013.01)

(58) Field of Classification Search
CPC ..... A01K 1/0107; A01K 1/011; A01K 1/0114
(Continued)

(56) References Cited

U.S. PATENT DOCUMENTS 3,908,597 A * 9/1975 Taylor .................. A01K 1/0114
119/166
4,602,593 A * 7/1986 Gross .................. A01K 1/0114
119/166
(Continued)

FOREIGN PATENT DOCUMENTS

CN    101686648 A    3/2010
CN    103648271 A    3/2014
(Continued)

OTHER PUBLICATIONS

International Preliminary Report on Patentability and Written Opinion from corresponding PCT application No. PCT/JP2015/056838 dated Sep. 5, 2017 (10 pgs).
(Continued)

*Primary Examiner* — David J Parsley
(74) *Attorney, Agent, or Firm* — Osha Liang LLP (57) ABSTRACT

An animal toilet having a front-rear direction, a right-left direction and a height direction including: a urine passing part that is provided with a plurality of holes through which urine passes and on which an excrement treatment material is to be placed; an absorbent body setting part that is provided below the urine passing part and on which an absorbent body is to be placed; an opening part that is provided above the urine passing part and allows an animal to come in and out; and side walls provided on both right and left sides of the opening part, a maximum height of the side wall in a forward area that is located forward of a center position in the front-rear direction being smaller than a minimum height of the side wall in a rearward area that is located rearward of the center position, a maximum opening width of the opening part in the forward area being larger than a maximum opening width of the opening part in the rearward area.

19 Claims, 6 Drawing Sheets

(58) Field of Classification Search
USPC .......................................... 119/165, 166, 169
See application file for complete search history.

(56) References Cited

U.S. PATENT DOCUMENTS

| | | | | |
|---|---|---|---|---|
| 4,771,731 | A * | 9/1988 | Derx | A01K 1/0107 119/166 |
| 5,598,811 | A * | 2/1997 | Merchant | A01K 1/0114 119/166 |
| 6,401,660 | B1 * | 6/2002 | Wolff | A01K 1/0114 119/165 |
| 6,408,790 | B1 * | 6/2002 | Maguire | A01K 1/0114 119/165 |
| 6,474,262 | B1 * | 11/2002 | Ceccon | A01K 1/0114 119/166 |
| 6,487,989 | B2 * | 12/2002 | Yamamoto | A01K 1/0114 119/161 |
| 7,380,519 | B2 * | 6/2008 | Ikegami | A01K 1/0107 119/161 |
| 8,707,901 | B2 * | 4/2014 | Matsuo | A01K 1/0107 119/166 |
| 8,887,667 | B2 * | 11/2014 | Maguire | A01K 1/0107 119/165 |
| 10,258,018 | B2 * | 4/2019 | Takagi | A01K 1/0107 |
| 2014/0069342 | A1 | 3/2014 | Khalili | |
| 2015/0020743 | A1 * | 1/2015 | Bauer | A01K 1/0107 119/166 |

FOREIGN PATENT DOCUMENTS

| | | |
|---|---|---|
| FR | 2.093.382 | 1/1972 |
| JP | 3010910 | 3/1995 |
| JP | 3010910 U | 3/1995 |
| JP | 2003-339267 | 12/2003 |
| JP | 2004-49030 A | 2/2004 |
| JP | 2006-149372 A | 6/2006 |
| JP | 2009-11181 A | 1/2009 |
| JP | 4447517 | 1/2010 |
| JP | 5768199 B | 6/2015 |
| WO | WO 2007/094029 A1 | 8/2007 |

OTHER PUBLICATIONS

European search report from corresponding European application No. 15883983.7 dated Jan. 31, 2018 (9 pgs).
International form PCT/ISA/237 from corresponding PCT application No. PCT/JP2015/056838 dated Apr. 3, 2015 (5 pgs).
Chinese search report from corresponding Chinese application No. 201580075392.0 dated May 23, 2018 (6 pgs).
Japanese Office Action from corresponding Japanese application No. 2015-093000 dated Oct. 30, 2018 (3 pgs).
Chinese Office Action from corresponding Chinese application No. 201580075392.0 dated Feb. 19, 2019 (4 pgs).
Office Action issued in corresponding Taiwanese Application No. 105105307, dated Aug. 7, 2019 (8 pages).
Patent Examination Report No. 1 dated Aug. 1, 2019, for the corresponding Australian patent application 2015384977 (6 pages).

* cited by examiner

TOILET FOR ANIMAL

RELATED APPLICATION

The present application is a 35 U.S.C. § 371 national stage filing of International Patent Application No. PCT/JP2015/056838, filed Mar. 9, 2015, to which priority is claimed under 35 U.S.C. § 120 and through which priority is claimed under 35 U.S.C. § 119 to Japanese Priority Patent Application No. 2015-040204, filed Mar. 2, 2015.

TECHNICAL FIELD

The present invention relates to toilets for animals.

BACKGROUND ART

As described in PTL, a toilet which is used by animals such as cats being reared indoors is conventionally known as a toilet for animals. This animal toilet includes, an upper container having an entrance/exit opening for animals and a liquid-permeable bottom face part through which urine passes, a lower container having a housing part that houses a placement container placing thereon a liquid absorption sheet for absorbing the urine that has passed through the bottom face part, and a cover for restricting the direction in which the animals comes in or out. Particulate matter is to be scatteringly arranged on a urine passing area in the bottom face part of the upper container.

The cover includes wall bodies arranged in a standing condition in the three directions of a peripheral frame having a substantially rectangular shape, and when viewed from above, the cover is a substantially U-shaped box body having an entrance/exit of animals in the remaining one direction. Also, the cover is removably attached to the upper container. The wall body is formed highly so as to prevent the particulate matter from flying out when an animal kicks, to the urinated site, the particulate matter scatteringly arranged on the urine passing area. Further, in the entrance/exit side of the animals, a pair of opposing wall bodies is formed so as to enter towards the inside.

CITATION LIST

Patent Literature

[PTL 1]
Japanese Patent Application Laid-open Publication No. 2009-11181

SUMMARY OF THE INVENTION

Technical Problem

In an animal toilet described in PTL 1, since the cover has high wall bodies and the entrance/exit of the animal is formed to have a narrow width, it has been difficult for the animals staying in the toilet to look the outside situation (for example, the approach of other animals and the like).

The present invention has been made in view of the above circumstances and an objective thereof is to provide an animal toilet in which an animal staying inside the toilet easily looks the outside situation.

Solution to Problem

A principal aspect of the present invention to achieve the above advantage is an animal toilet having a front-rear direction, a right-left direction and a height direction including:

a urine passing part that is provided with a plurality of holes through which urine passes and on which an excrement treatment material is to be placed;

an absorbent body setting part that is provided below the urine passing part and on which an absorbent body is to be placed;

an opening part that is provided above the urine passing part and allows an animal to come in and out; and side walls provided on both right and left sides of the opening part, a maximum height of the side wall in a forward area that is located forward of a center position in the front-rear direction being smaller than a minimum height of the side wall in a rearward area that is located rearward of the center position, a maximum opening width of the opening part in the forward area being lager than a maximum opening width of the opening part in the rearward area. Other features of the present invention will be made clear through the present specification with reference to the accompanying drawings.

Effects of the Invention

According to the present invention, it becomes easier for an animal staying in the toilet to look the outside situation.

BRIEF DESCRIPTION OF THE DRAWINGS

FIGS. 1A and 1B show one configuration example of an animal toilet according to the present embodiment of the present invention.

DESCRIPTION OF EMBODIMENTS

At least the following matters will be made clear by the description in the present specification and the accompanying drawings.

Disclosed is an animal toilet having a front-rear direction, a right-left direction and a height direction including:

a urine passing part that is provided with a plurality of holes through which urine passes and on which an excrement treatment material is to be placed;

an absorbent body setting part that is provided below the urine passing part and on which an absorbent body is to be placed;

an opening part that is provided above the urine passing part and allows an animal to come in and out; and side walls provided on both right and left sides of the opening part, a maximum height of the side wall in a forward area that is located forward of a center position in the front-rear direction being smaller than a minimum height of the side wall in a rearward area that is located rearward of the center position, a maximum opening width of the opening part in the forward area being lager than a maximum opening width of the opening part in the rearward area. Hereby, it becomes easier for an animal staying in the toilet to look the outside situation. Further, the animal can easily come in the toilet.

In the above animal toilet, it is preferable that the side wall is continuously lowered from the rear to the front. Hereby, a field of view in a front direction of the animal staying in the animal toilet is further widened, and the animal can easily look the outside situation.

In the above animal toilet, it is preferable that a degree to which the side wall is lowered is changed on the way. Hereby, even in a case where a tool such as a shovel is hung on the side wall, the tool hardly slips in the front direction and can be stably hung on the side wall.

In the above animal toilet, it is preferable that a degree to which the side wall in the forward area is lowered is larger than a degree to which the side wall in the rearward area is lowered. Hereby, the field of view in the front direction can be widened, and the tool such as a shovel can be hung on the side wall in the rearward area.

In the above animal toilet, it is preferable that in a state seen from the front along the front-rear direction, a width of an upper part of the opening part is narrower than a width of a center part of the opening part in the height direction, and a width of a lower part of the opening part is narrower than the width of the center part of the opening part. Hereby, it becomes much easier for owners to visually recognize the rear part inside the animal toilet.

In the above animal toilet, it is preferable that the animal toilet includes: a cover; an upper container; a lower container; and a tray, the urine passing part is provided to the upper container, the absorbent body setting part is provided to the tray, the opening part is provided to the cover, and the side wall includes a part of the cover, a part of the upper container and a part of the lower container. Hereby, the animal toilet can be disassembled into each member, and workability such as cleaning can be improved.

In the above animal toilet, it is preferable that the upper container includes a bottom face part located at the lowermost position in an inside of the upper container, and the center of the bottom face part is located rearward of the center position in the front-rear direction. Hereby, the side wall in the rearward area which is formed to be higher than that in the forward area can restrain the excrement treatment material from flying out.

In the above animal toilet, it is preferable that, in the cover, a maximum inward inclination of the side wall in the forward area is smaller than a maximum inward inclination of the side wall in the rearward area. Thus, in the forward area, the field of view in the right-left direction of the animal staying in the animal toilet is widened, and in the rearward area, the excrement treatment material that is scatteringly arranged to the upper container can be restrained from flying out.

In the above animal toilet, it is preferable that the cover includes a forward wall part in front of the opening part, and a cross section of the forward wall part has only a shape protruding outward or a planar shape. Hereby, the forefoot of the animal may not go in a depression when the animal comes in the animal toilet and the animal can stably put his/her forefoot on the wall part. Thus, the animal can easily come in the animal toilet.

Present Embodiment

An animal toilet according to an embodiment of the present invention is used by animals such as cats being reared indoors. The "animals" in the present specification include so-called pets such as a cat, dog, rabbit and hamster, a baby of a tiger or lion and the like.

As an example, usage of the animal toilet in a case where the animal is a cat is as follows. First, the cat comes in the animal toilet and urinates or defecates from above excrement treatment material called, for example, cat litter, sands or the like. Then, the cat kicks the excrement treatment material with his/her feet and hides the excrement. Owners exclude a soiled part of the excrement treatment material together with the excrement from the animal toilet, and new excrement treatment material is supplied by the excluded amount.

<Overall Configuration of Animal Toilet 1>

The overall configuration of an animal toilet 1 will be described with reference to FIGS. 1A, 1B and 2.

Figure 1A:
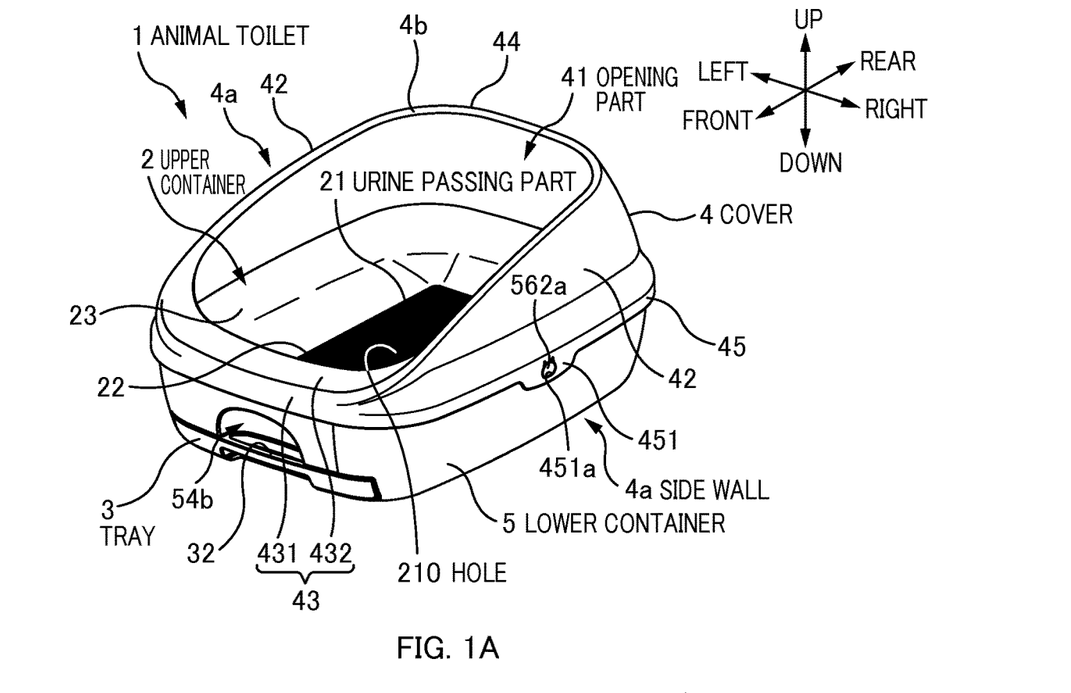
FIG. 1A is a perspective view.
Figure 1B:
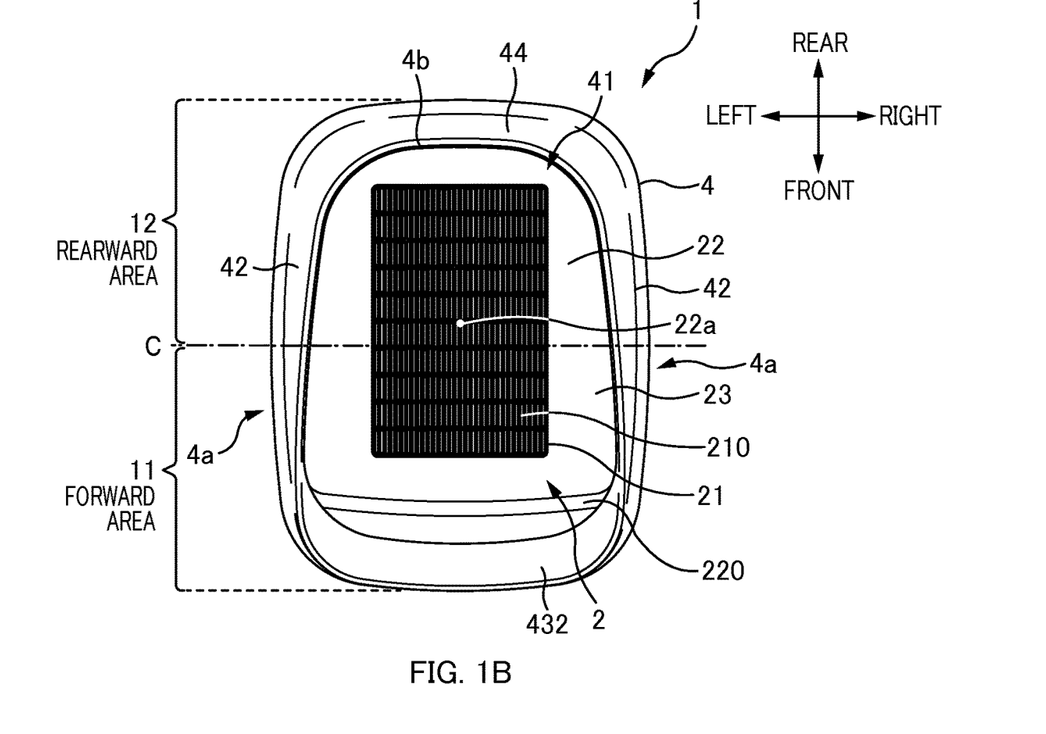
FIG. 1B is a top view.

FIGS. 1A and 1B illustrate an example of the configuration of an animal toilet 1 according to an embodiment of the present invention, FIG. 1A is a perspective view, and FIG. 1B is a top view. FIG. 2 is an exploded explanatory view of the animal toilet 1.

The animal toilet 1 is placed on such as an indoor floor for use, and includes a front-rear direction, a right-left direction, and a height direction. In the present embodiment, the animal toilet 1 has a longitudinal direction in the front-rear direction and a lateral direction in the right-left direction. Note that, the front-rear direction, the right-left direction and the height direction are directions orthogonal to one another. In the following description, the placement surface side of the animal toilet 1 in the height direction is referred to as a downward direction and its opposite side is referred to as an upward direction.

The animal toilet 1 is configured with four members including an upper container 2, a tray 3, a cover 4, and a lower container 5. In the present embodiment, the configuration having the four separable members enables the toilet 1 to be disassembled into each of the members, and thus workability such as cleaning can be improved. The upper container 2, the tray 3, the cover 4, and the lower container 5 is formed by molding resin such as polyethylene (PE), polypropylene (PP), polyethylene terephthalate (PET) and the like.

An assembly method of the animal toilet 1 is described as follows. As shown in FIG. 2, the upper container 2 is assembled from above the lower container 5. Then, the cover 4 is assembled from above the upper container 2 with respect to the lower container 5 to which the upper container 2 has been assembled. The tray 3 is slidable with respect to the lower container 5 in the front-rear direction and is housed into the lower container 5.

In the following description, the front-rear direction is defined such that the direction in which the tray 3 is housed into the lower container 5 is referred to as a rear direction, and the direction in which the tray 3 is pulled out from the lower container 5 is referred to as a front direction. Further, as shown in FIG. 1B, the center position in the front-rear direction is referred to as C, a forward area from the center position C is referred to as a forward area 11, and a rearward area from the center position C is referred to as a rearward area 12.

The upper container 2 is a box-shaped member with its upper side opened, and includes a bottom face part 22 located on the lowermost position in the inside of the upper container, an inclined part 220 extending obliquely upward from one end at the front of the bottom face part 22, a side face 23 arranged vertically upward from the peripheral edge of the bottom face part 22, and a rib 24 formed by folding back the upper end of the side face 23 downwardly.

As shown in FIG. 1B, the center 22a of the bottom face part 22 is positioned rearward from the center position C. A plurality of holes 210 through which urine passes is provided, and a urine passing part 21 on which the excrement treatment material is to be placed is provided on the bottom face part 22 in the present embodiment. Thus, since the bottom face part 22 is positioned while being biased to the rearward area 12 side in the front-rear direction, the excrement treatment material is to be placed rearward from the center position C. Note that, the urine passing part 21 is not necessarily provided only on the bottom face part 22, and for example, may be provided over the inclined part 220 side. Even in this case, the excrement treatment material to be placed on the urine passing part 21 is accumulated on the bottom face part 22 located at the lowermost position, and thus the excrement treatment material is positioned to the rearward area 12 side.

Figure 2:
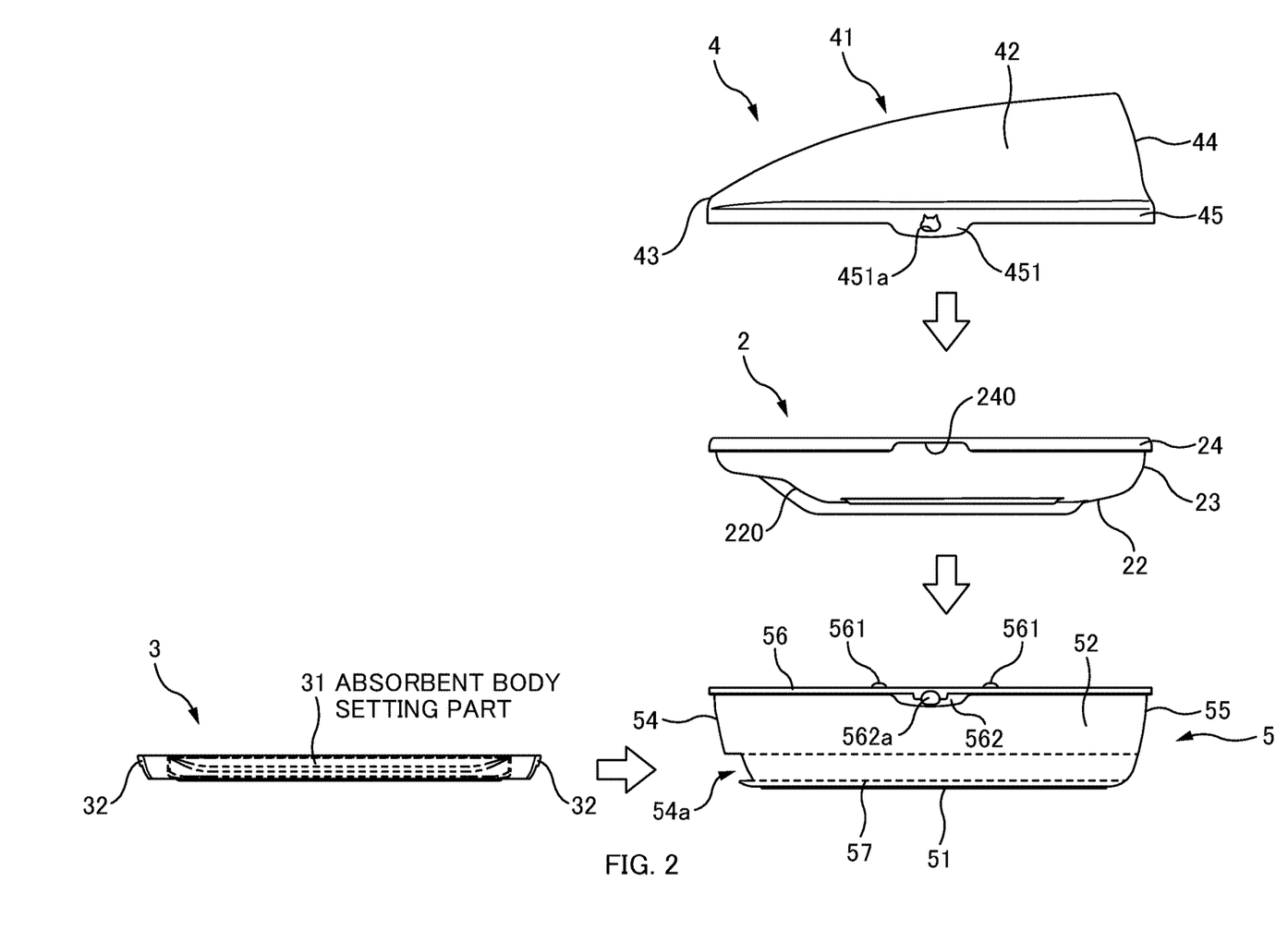
FIG. 2 is an exploded explanatory view of the animal toilet.

As shown in FIG. 2, notches 240 are formed at the center of the rib 24 in the front-rear direction and at the positions opposing in the right-left direction respectively. Thus, it becomes possible for owners and the like to assemble the upper container 2 with the lower container 5 by catching the notches 240 with fingers and to remove the upper container 2 from the lower container 5, and this facilitates the works to be performed. Note that, only one notch 240 of the two notches 240 is shown in FIG. 2.

The tray 3 is a member whose thickness in the height direction (up-down direction) is formed thinly, and the tray 3 has an absorbent body setting part 31 with its upper side opened and handles 32 for putting the tray 3 in or out of the lower container 5. Urine excreted from above the excrement treatment material passes through the urine passing part 21 of the upper container 2 and is absorbed by the absorbent body placed on the absorbent body setting part 31 which is provided below the urine passing part 21. The absorbent body is an absorbent sheet including such as a high molecular absorbent material.

The handles 32 are, as shown in FIG. 2, formed on both ends in the front-rear direction, respectively, and the tray 3 can also be used with the front and the rear reversed. Note that, the absorbent body setting part 31 is shown by broken lines in FIG. 2.

The cover 4 includes an opening part 41 for allowing the animals to come in or out, side wall parts 42 provided to both sides respectively in the right-left direction of the opening part 41, a forward wall part 43 provided at the front of the opening part 41, a rearward wall part 44 provided at the rear of the opening part 41, and an extending part 45 that extends toward the lower direction from the lower end of the side wall part 42, the forward wall part 43 and the rearward wall part 44. In the present embodiment, the side wall part 42, the forward wall part 43, the rearward wall part 44 and the extending part 45 are integrally formed. Further, the cover 4 does not have a bottom face and penetrates in the height direction (up-down direction).

The opening part 41 is provided above the urine passing part 21. The side wall part 42 configures a part of the side wall 4a provided on both right and left sides of the opening part 41 in the present embodiment. As shown in FIGS. 1A and 2, the upper end of the side wall part 42 in the rearward area 12 is located higher than that in the forward area 11 in the height direction. Here, as described above, the excrement treatment material is positioned on the rearward area 12 side, and thus in a case where the cat kicks the excrement treatment material, the scattering of the excrement treatment material can be restrained by the side wall part 42 in the rearward area 12 whose upper end position is higher than that in the forward area 11.

As shown in FIGS. 1A and 1B, the side wall part 42 and the rearward wall part 44 have a folded portion 4b in which the upper end is folded inwardly (to the opening part 41 side) and in the lower direction. Further, the forward wall part 43 has a front face part 431 facing to the front direction and a top face part 432 facing to the upper direction. The top face part 432 is continuously formed from the folded portion 4b of the side wall part 42 and rearward wall part 44.

The extending part 45 has fitting pieces 451 extending downward at the center of the extending part 45 in the front-rear direction and at the positions opposing to each other in the right-left direction. A penetration hole 451a is formed in the fitting piece 451. In the present embodiment, the penetration hole 451a is formed in a shape of a cat face.

The lower container 5 is a box-shape member with the upper side opened similar to the upper container 2 and includes a bottom face 51, side wall parts 52 arranged vertically upward from the both ends in the right-left direction of the bottom face 51, a forward wall part 54 arranged vertically upward from the front end of the bottom face 51, a rearward wall part 55 arranged vertically upward from the rear end of the bottom face 51, and a rib 56 formed by folding back downward the upper ends of the side wall part 52, the forward wall part 54 and the rearward wall part 55. In the present embodiment, the side wall part 52 and the rib 56 configure a part of the side wall 4a provided on both right and left sides of the opening part 41. Further, inside the lower container 5, a housing part 57 for housing the tray 3 is formed. Note that, in FIG. 2, the housing part 57 is shown by broken lines.

In the forward wall part 54, as shown in FIG. 2, a putting in/out port 54a is formed for allowing the tray 3 to be put in or out of the housing part 57. Further, as shown in FIG. 1A, a recessed part 54b for allowing hands to easily catch the handle 32 of the tray 3 is formed in the forward wall part 54.

The rib 56 includes fitting pieces 562 extending downward at the center of the rib 56 in the front-rear direction and at the positions opposing to each other in the right-left direction. In the fitting piece 562, a projecting part 562a having a substantially elliptical shape is formed. As shown in FIG. 1A, this projecting part 562a is fitted into the penetration hole 451a formed in the fitting piece 451 of the cover 4.

Further, on the upper end of the rib 56, two protrusions 561 protruding upward are respectively arranged at the positions opposing to each other in the right-left direction. When the upper container 2 is assembled with the lower container 5, these protrusions 561 are interposed in a space formed by folding back the upper end of the upper container 2 in forming the rib 24 of the upper container 2, and this restrains movement of the upper container 2 in the right-left direction with respect to the lower container 5. In the present embodiment, the rib 24 of the upper container 2 is positioned on the rib 56 of the lower container 5 in a state that the upper container 2 is assembled with the lower container 5, and the rib 24 configures a part of the side wall 4a together with the side wall part 52 and rib 56 of the lower container 5.

<Shape of Side Wall 4a>

Next, the shape of the side wall 4a is described with reference to FIG. 3.

Figure 3:
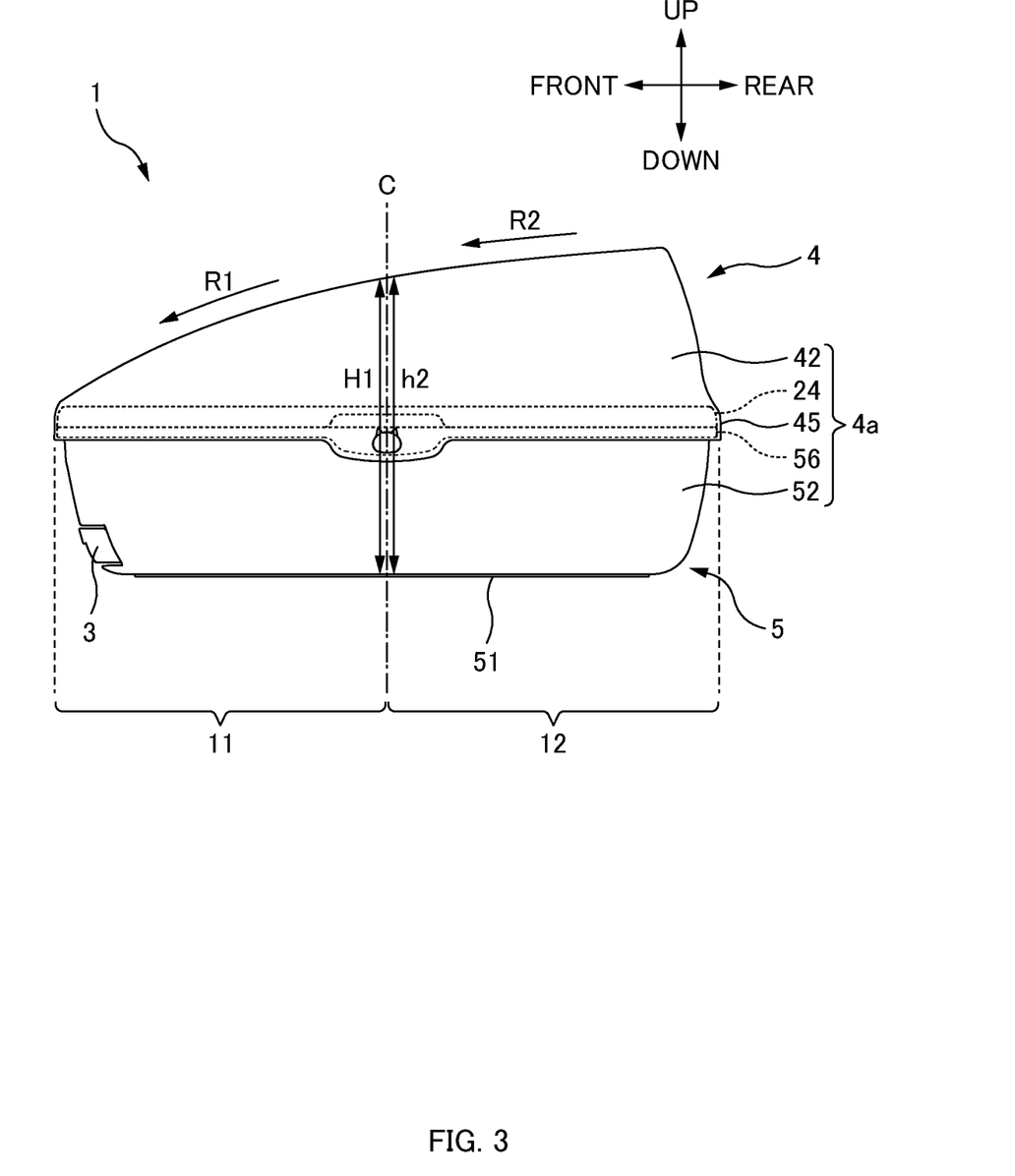
FIG. 3 is a side view of the animal toilet.

FIG. 3 is a side view of the animal toilet 1. In FIG. 3, the rib 56 of the lower container 5 and the rib 24 of the upper container 2 are shown by broken lines.

As shown in FIG. 3, in the animal toilet 1, the maximum height H1 of the side wall 4a in the forward area 11 which is frontward from the center position C in the front-rear direction is smaller than the minimum height h2 of the side wall 4a in the rearward area 12 which is rearward from the center position C. This expands a forward side visible range in the height direction (up-down direction) of the animal staying in the animal toilet 1, and the animal can easily look the outside situation. Further, since a feeling of pressure due to the side wall 4a is restrained in the forward area 11, it becomes easier for the animal to come in the animal toilet 1.

In the present embodiment, the side wall 4a is configured with the side wall part 42 and extending part 45 of the cover 4, the rib 24 of the upper container 2, and the side wall part 52 and rib 56 of the lower container 5. That is, the side wall 4a includes a part of the cover 4, a part of the upper container 2, and a part of the lower container 5. Thus, "the height of the side wall 4a" indicates a distance from the bottom face 51 of the lower container 5 to the upper end of the side wall part 42 of the cover 4.

The side wall 4a is continuously lowered from the rear to the front. Thus, the more forward the animal stays in the animal toilet 1, the wider the field of view of the animal becomes, and this allows the animal to easily look the outside situation. Note that, the side wall 4a does not have to be continuously lowered from the rear to the front. If at least the maximum height H1 of the side wall 4a in the forward area 11 is smaller than the minimum height h2 of the side wall 4a in the rearward area 12, the shape of the upper end part of the side wall 4a can be appropriately changed.

Further, a degree to which the height of the side wall 4a is lowered is changed on the way. Here, the "degree" means an amount of change in the up-down direction of the upper end part per unit length in the front-rear direction of the side wall 4a. By providing a portion in which the degree to which the height of the side wall 4a is lowered is small, for example, even in a case where a tool such as a shovel to be used when scooping the excrement treatment material is hung on the side wall 4a, the tool hardly slips in the front direction and can be stably hung on the side wall 4a. Note that, the degree to which the height of the side wall 4a is lowered is not necessarily changed on the way, and the height thereof may be lowered in a certain degree.

In the present embodiment, the degree R1 to which the side wall 4a in the forward area 11 is lowered is larger than the degree R2 to which the side wall 4a in the rearward area 12 is lowered. That is, the side wall 4a in the rearward area 12 is lowered more gently than the side wall 4a in the forward area 11.

Hereby, not only the field of view in the front direction of the animal staying in the animal toilet 1 can be widened, but also the tool hardly slips in the rearward area 12 compared to the forward area 11 even in a case where the tool is hung on the side wall 4a, and the tool can be hold stably on the side wall 4a. However, the degree R1 to which the side wall 4a in the forward area 11 is lowered is not necessarily larger than the degree R2 to which the side wall 4a in the rearward area 12 is lowered.

<Shape of Cover 4>

Next, the shape of the cover 4 is described with reference to FIGS. 4 and 5.

Figure 4:
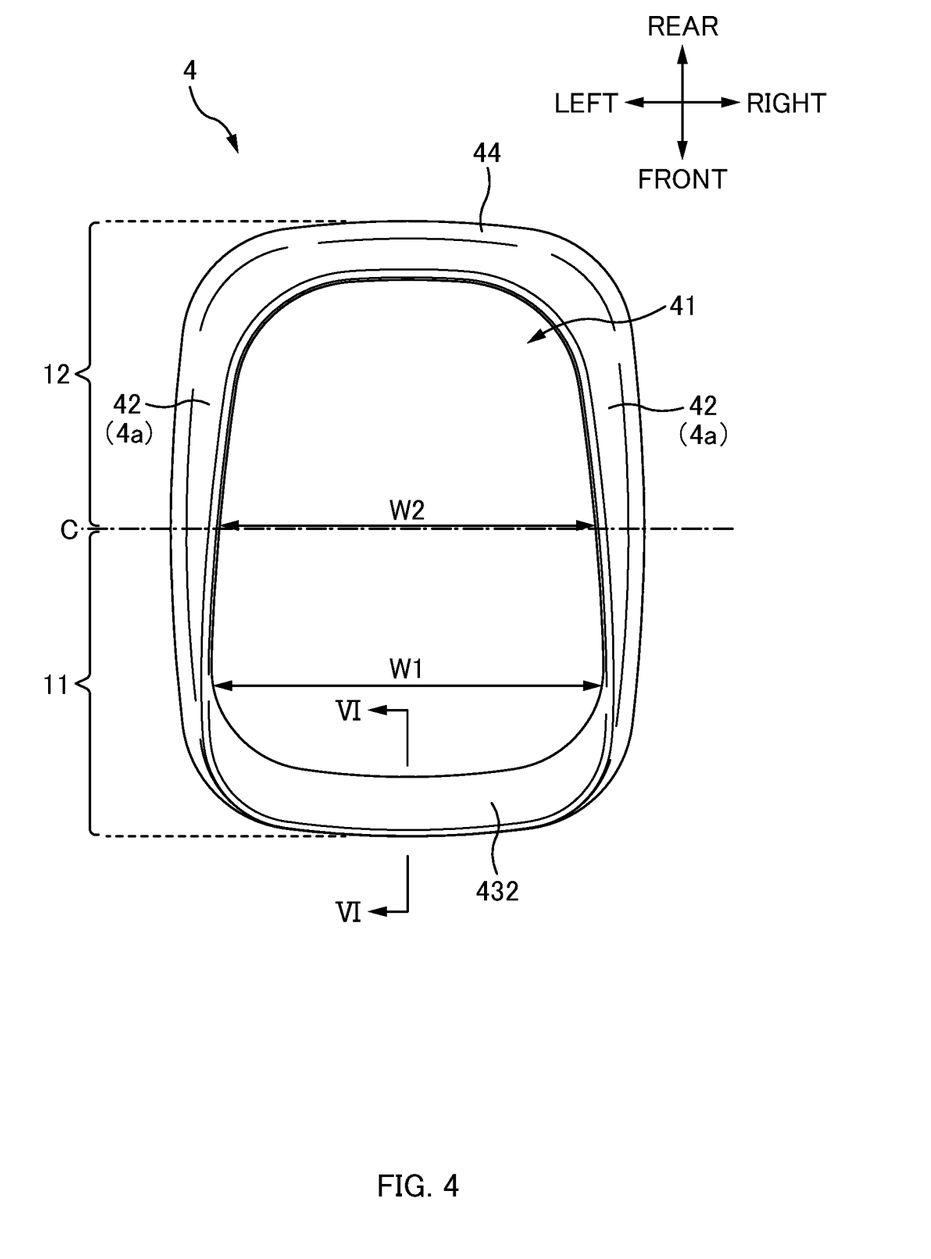
FIG. 4 is a top view of a cover.

FIG. 4 is a top view of the cover 4. FIG. 5 is a drawing of the cover 4 seen from the front direction.

As shown in FIG. 4, in the cover 4, the maximum opening width W1 of the opening part 41 in the forward area 11 is larger than the maximum opening width W2 of the opening part 41 in the rearward area 12 (W1>W2). Thus, the field of view in the right-left direction of the front side of the animal staying in the animal toilet 1 is widened, and the animal can easily look the outside situation. Further, when the owner or the like looks inside the animal toilet 1 from the front, the excrement and the like in the animal toilet 1 can be easily visually recognized, and it becomes easier to put hands inside the toilet when, for example, cleaning the animal toilet 1. Thus, this leads to an improvement of workability. In the present embodiment, the opening part 41 has a trapezoidal shape, the four corners of which are rounded, when seen from the upper direction.

In the animal toilet 1, the height of the side wall 4a in the forward area 11 is formed lower than the height of the side wall 4a in the rearward area 12, and the opening width of the opening part 41 in the forward area 11 is larger than the opening width of the opening part 41 in the rearward area 12. Thus, it becomes easier for the animal staying in the animal toilet 1 to look the outside situation in the front side.

Figure 5:
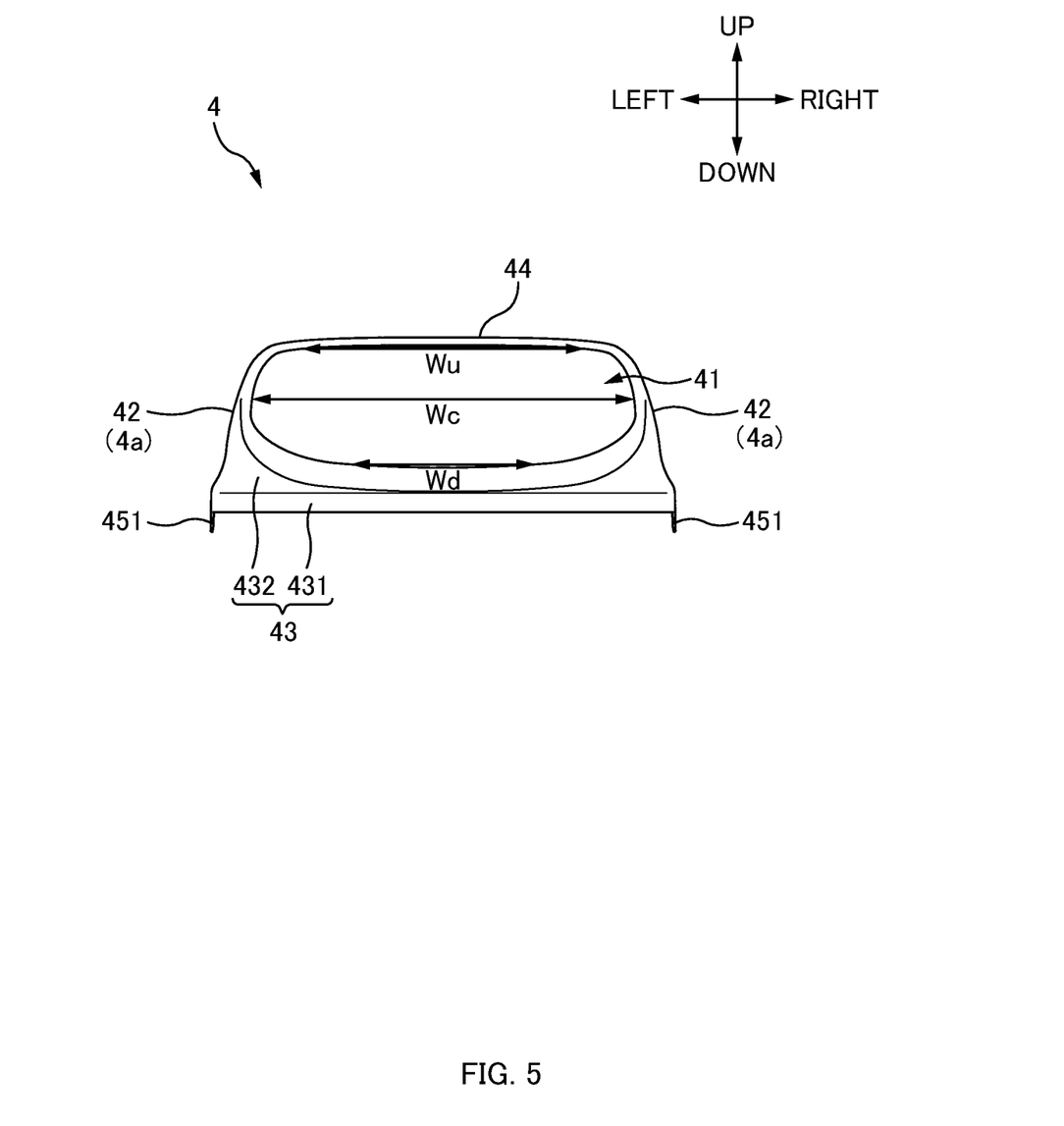
FIG. 5 is a drawing of the cover seen from the front direction.

As shown in FIG. 5, in the cover 4, a width Wu of the upper part of the opening part 41 is narrower than a width Wc of the center part of the opening part 41 in the height direction (Wu<Wc), and a width Wd of the lower part of the opening part 41 is formed narrower than the width Wc of the center part of the opening part 41 (Wd<Wc) in a state seen from the front along the front-rear direction. When seen from the front to the rear, even the corner portion of the inside of the rearward side wall part 44 can be visually recognized, and thus it becomes much easier for the owner or the like to visually recognize the rear part in the animal toilet 1. In the present embodiment, the width Wd of the lower part is formed narrower than the width Wu of the upper part (Wd<Wu<Wc). Note that, the width does not have to be formed to be narrow in the order of width Wc of the center part, width Wu of the upper part and width Wd of the lower part. For example, these widths may be all formed in the same width.

Further, in the cover 4, the side wall part 42 is inclined so as to tilt inwardly. More specifically, as shown in FIGS. 1A, 1B, and 5, the side wall part 42 has an inward tilt angle that becomes larger from the front to the rear. That is, in the cover 4, the maximum inward inclination of the side wall part 42 (side wall 4a) in the forward area 11 is smaller than the maximum inward inclination of the side wall part 42 (side wall 4a) in the rearward area 12.

Hereby, the field of view in the right-left direction of the forward area 11 of the animal staying in the animal toilet 1 is widened, and the side wall part 42 is formed so as to be further tilted inwardly in the rearward area 12. This restrains the scattering of the excrement treatment material to be placed on the urine passing part 21. However, the invention is not limited thereto, and for example, the maximum inward inclination of the side wall part 42 in the forward area 11 may be the same as the maximum inward inclination of the side wall part 42 in the rearward area.

<Configuration of Forward Wall Part 43 of Cover 4>

Next, the configuration of the forward wall part 43 of the cover 4 will be described with reference to FIGS. 6A and 6B.

Figure 6A:
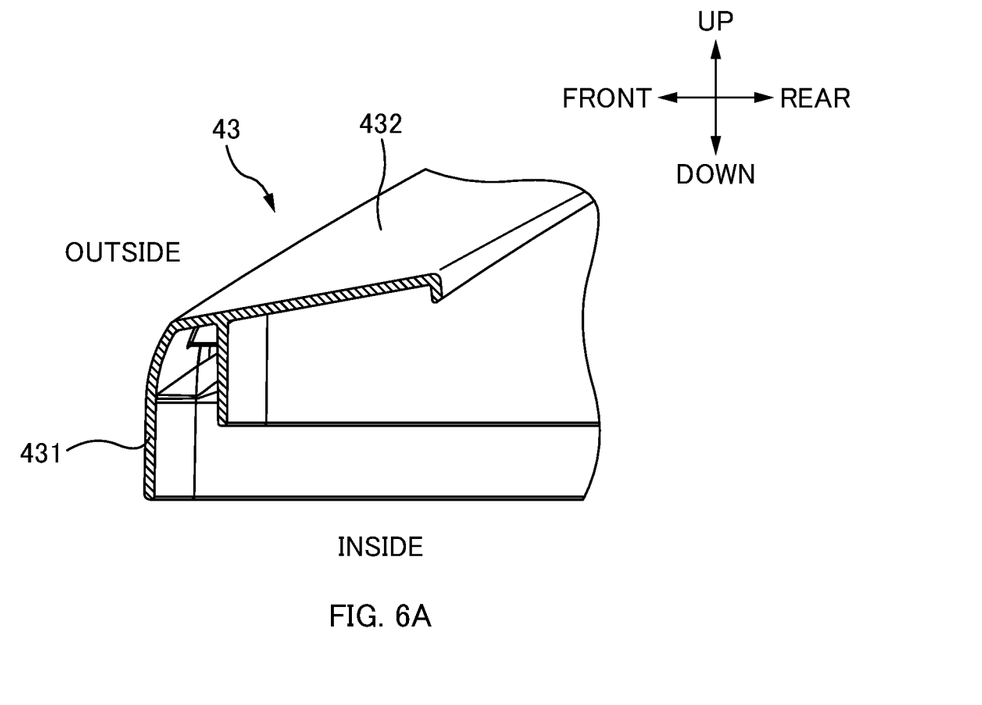
FIG. 6A is an enlarged cross-sectional view of a forward wall of the cover according to the present embodiment.
Figure 6B:
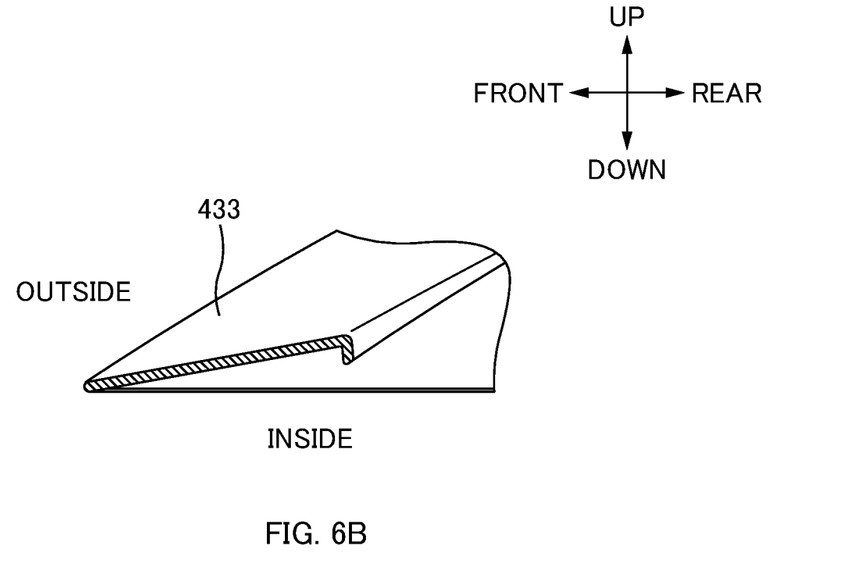
FIG. 6B is an enlarged cross-sectional view of the forward wall of the cover according to a modified example.

FIG. 6A is an enlarged cross-sectional view of the forward wall part 43 of the cover 4 according to the present embodiment, and FIG. 6B is an enlarged cross-sectional view of a forward wall part 433 of the cover 4 according to the modified example.

As shown in FIG. 6A, in the forward wall part 43 of the cover 4, a front face part 431 extends downwardly from one end of a top face part 432 in the direction intersecting with the top face part 432. Thus, the cross section of the forward wall part 43 has a shape protruding outward.

Note that, the cross section of the forward wall part 43 does not necessarily have a shape protruding outward, and for example, may have a shape protruding inward. However, in this case, since the forward wall part 43 is depressed, the forefoot of the animal goes in the depression when the animal comes in the animal toilet 1, and the animal may lose a balance. On the other hand, in a case where the cross section of the forward wall part 43 has a shape protruding outward, the animal can put his/her forefoot on the top face part 432 stably, and thus the animal can easily come in the animal toilet 1.

Further, a modified example shown in FIG. 6B can also be considered. The forward wall part 433 according to the modified example differs from the forward wall part 43 according to the present embodiment, does not have the front face part 431, and is configured only with the top face part. That is, the cross section of the forward wall part 433 has only a planar shape as shown in FIG. 6B. Even in this case, the animal can stably put his/her forefoot on the forward wall part 433 having a planar shape cross-section.

Other Embodiments

The foregoing embodiments are intended to facilitate the understanding of the present invention but not to limit the invention. And it is needless to say that modifications and improvements of the present invention are possible without departing from the scope of the invention, and equivalents thereof are also encompassed by the invention.

In the above-mentioned embodiment, the animal toilet 1 is configured by combining the four members including the upper container 2, the tray 3, the cover 4 and the lower container 5, and the side wall 4a has a part of the cover 4, a part of the upper container 2 and a part of the lower container 5. However, the present invention is not limited thereto. For example, the upper container 2 and the lower container 5 may be integrally formed, the upper container 2, the lower container 5 and the cover 4 may be integrally formed, and the configuration can be appropriately changed in accordance with applications. That is, the animal toilet 1 may include at least the urine passing part 21, the absorbent body setting part 31 provided below the urine passing part 21, the opening part 41 provided above the urine passing part 21, and the side walls 4a provided on both right and left sides of the opening part 41.

REFERENCE SIGNS LIST

1 animal toilet
2 upper container
3 tray
4 cover
4a side wall
5 lower container
11 forward area
12 rearward area
21 urine passing part
22 bottom face part
31 absorbent body setting part
41 opening part
43 forward wall part
210 hole
C center position

The invention claimed is:
1. An animal toilet having a front-rear direction, a right-left direction and a height direction comprising:
 a urine passing part that is provided with a plurality of holes through which urine passes and on which an excrement treatment material is to be placed;
 an absorbent body setting part that is provided below the urine passing part and on which an absorbent body is to be placed; and
 an opening part that is provided above the urine passing part and allows an animal to come in and out;
the animal toilet further including:
 a cover;
 an upper container;
 a lower container; and
 a tray,
the urine passing part being provided in the upper container, the absorbent body setting part being provided in the tray, the opening part being provided in the cover,
each of the cover, the upper container and the lower container having side walls that align to define an overall side wall of the animal toilet,
the side walls of each of the cover, the upper container and the lower container having a front wall portion, a rear wall portion, a right wall portion and a left wall portion,
a maximum height of the side wall in a forward area that is located forward of a center position in the front-rear direction being smaller than a minimum height of the side wall in a rearward area that is located rearward of the center position,
a maximum opening width of the opening part in the forward area being lager than a maximum opening width of the opening part in the rearward area,
a maximum inward inclination of the right wall portion of the cover and the left wall portion of the cover in the forward area being smaller than a maximum inward inclination of the right wall portion of the cover and the left wall portion of the cover in the rearward area,
the cover being positioned above each of the upper container, the lower container and the tray, and
an entirety of the inward inclinations is a portion of the side walls of the cover.
2. An animal toilet according to claim 1, wherein the right and left wall portions of the cover are continuously lowered from the rear to the front.
3. An animal toilet according to claim 2, wherein a degree to which the right and left wall portions of the cover are lowered increases non-linearly from the rear to the front.
4. An animal toilet according to claim 3, wherein a degree to which the right and left wall portions of the cover in the forward area are lowered is larger than a degree to which the right and left wall portions of the cover in the rearward area are lowered.
5. An animal toilet according to claim 1, wherein in a state seen from the front along the front-rear direction, a width of an upper part of the opening part is narrower than a width of a center part of the opening part in the height direction, and a width of a lower part of the opening part is narrower than the width of the center part of the opening part.
6. An animal toilet according to claim 1, wherein
the upper container includes in an inner side thereof a bottom face part located at the lowermost position, and the center of the bottom face part is located rearward of the center position in the front-rear direction.
7. An animal toilet according to claim 1, wherein
the front wall portion of cover includes a front face wall part in front of the opening part, and
a cross section of the front face wall part consists of a shape that protrudes outward or a planar shape.

8. An animal toilet according to claim 2, wherein in a state seen from the front along the front-rear direction, a width of an upper part of the opening part is narrower than a width of a center part of the opening part in the height direction, and a width of a lower part of the opening part is narrower than the width of the center part of the opening part.

9. An animal toilet according to claim 3, wherein in a state seen from the front along the front-rear direction, a width of an upper part of the opening part is narrower than a width of a center part of the opening part in the height direction, and a width of a lower part of the opening part is narrower than the width of the center part of the opening part.

10. An animal toilet according to claim 4, wherein in a state seen from the front along the front-rear direction, a width of an upper part of the opening part is narrower than a width of a center part of the opening part in the height direction, and a width of a lower part of the opening part is narrower than the width of the center part of the opening part.

11. An animal toilet according to claim 2, wherein
the upper container includes in an inner side thereof a bottom face part located at the lowermost position, and
the center of the bottom face part is located rearward of the center position in the front-rear direction.

12. An animal toilet according to claim 3, wherein
the upper container includes in an inner side thereof a bottom face part located at the lowermost position, and
the center of the bottom face part is located rearward of the center position in the front-rear direction.

13. An animal toilet according to claim 4, wherein
the upper container includes in an inner side thereof a bottom face part located at the lowermost position, and
the center of the bottom face part is located rearward of the center position in the front-rear direction.

14. An animal toilet according to claim 5, wherein
the upper container includes in an inner side thereof a bottom face part located at the lowermost position, and
the center of the bottom face part is located rearward of the center position in the front-rear direction.

15. An animal toilet according to claim 2, wherein
the front wall portion of the cover includes a front face wall part in front of the opening part, and
a cross section of the front face wall part consists of a shape that protrudes outward or a planar shape.

16. An animal toilet according to claim 3, wherein
the front wall portion of the cover includes a front face wall part in front of the opening part, and
a cross section of the front face wall part consists of a shape that protrudes outward or a planar shape.

17. An animal toilet according to claim 4, wherein
the front wall portion of the cover includes a front face wall part in front of the opening part, and
a cross section of the front face wall part consists of a shape that protrudes outward or a planar shape.

18. An animal toilet according to claim 5, wherein
the front wall portion of the cover includes a front face wall part in front of the opening part, and
a cross section of the front face wall part consists of a shape that protrudes outward or a planar shape.

19. An animal toilet according to claim 6, wherein
the front wall portion of the cover includes a front face wall part in front of the opening part, and
a cross section of the front face wall part consists of a shape that protrudes outward or a planar shape.

* * * * *